United States Patent [19]

Kirner et al.

[11] 4,245,993

[45] Jan. 20, 1981

[54] HIGHLY CONCENTRATED, STABLE, FREE-FLOWING AQUEOUS DISPERSIONS OF DIAZOTIZABLE AROMATIC AMINES BEARING ELECTROPHILIC SUBSTITUENTS

[75] Inventors: Hans D. Kirner, Pratteln; Jacques Wegmann, Bettingen, both of Switzerland

[73] Assignee: Rohner AG Pratteln, Pratteln, Switzerland

[21] Appl. No.: 956,232

[22] Filed: Oct. 31, 1978

[30] Foreign Application Priority Data

Nov. 2, 1977 [CH] Switzerland ............. 13372/77

[51] Int. Cl.$^3$ .............. C09B 29/033; C09B 67/46; D06P 1/52; D06P 1/90
[52] U.S. Cl. ............................................. 8/664; 8/665; 8/666
[58] Field of Search .............. 8/44, 45, 83, 85 R, 8/85 B, 46

[56] References Cited

U.S. PATENT DOCUMENTS

| | | | |
|---|---|---|---|
| 2,893,815 | 7/1959 | Stanley et al. | 8/44 |
| 2,971,812 | 2/1961 | Moran et al. | 8/83 |
| 3,961,884 | 6/1976 | Hertel et al. | 8/44 |
| 4,057,389 | 11/1977 | Feess et al. | 8/44 |

FOREIGN PATENT DOCUMENTS

| | | |
|---|---|---|
| 2249533 | 4/1975 | Fed. Rep. of Germany . |
| 2346504 | 4/1975 | Fed. Rep. of Germany . |
| 2346502 | 7/1975 | Fed. Rep. of Germany . |
| 2449781 | 3/1976 | Fed. Rep. of Germany . |
| 2449782 | 3/1976 | Fed. Rep. of Germany . |
| 2449783 | 3/1976 | Fed. Rep. of Germany . |
| 2346612 | 4/1976 | Fed. Rep. of Germany . |
| 2555711 | 6/1976 | Fed. Rep. of Germany . |
| 2323435 | 4/1977 | France . |
| 516629 | 1/1972 | Switzerland ............................. 8/85 B |
| 835637 | 5/1960 | United Kingdom . |

Primary Examiner—John Kight, III
Attorney, Agent, or Firm—Finnegan, Henderson, Farabow, Garrett & Dunner

[57] ABSTRACT

The dispersions contain
(a) 30 to 60% by weight of a diazotizable aromatic amine bearing electrophilic substituents and having an average particle size below 10 μm (microns),
(b) 0.1 to 5% by weight of a water-soluble polymer or copolymer of an N-vinyl-lactam,
(c) 0.1 to 5% by weight of an anionic dispersing agent,
(d) 0 to 30% by weight of at least one hydrotropic compound and/or at least one compound which lowers the freezing point and
(e) water.

The dispersions can be prepared by wet-grinding of the components. They can be used to produce azopigments in substance or azodyestuffs on textile substrates. Their diazotization proceeds very quickly and completely.

13 Claims, No Drawings

HIGHLY CONCENTRATED, STABLE, FREE-FLOWING AQUEOUS DISPERSIONS OF DIAZOTIZABLE AROMATIC AMINES BEARING ELECTROPHILIC SUBSTITUENTS

The invention relates to highly concentrated, stable, free-flowing aqueous dispersions of diazotizable aromatic amines bearing electrophilic substituents, to methods of preparing these dispersions, to the use of the dispersions to produce azopigments in substance or azodyestuffs on textile substrates and to the pigments resp. dyed or printed textile materials produced thus.

Diazotizable aromatic amines bearing electrophilic substituents are used in commercial practice on a large scale to produce water-insoluble azodyestuffs on textile materials made of cellulose fibers. Amines of this type are listed, for example, in the Colour Index, 3rd Edition (1971) under the title "Azoic Diazo Components" which is incorporated herein by reference thereto. They are sold in the form of powder compositions which contain the free bases.

The utilization of these compositions is connected with some disadvantages as they tend to dust and have a relatively large volume. The tendency to dust can lead to health injuries and the large volume makes the transportation of the compounds expensive. However, especially disadvantageous is the fact that the amines in the powder compositions have a relatively large particle size and can therefore only be diazotized very slowly and incompletely.

It has therefore already been proposed to formulate diazotizable aromatic amines in the form of their water-soluble salts. Formulations of this type do bring advantages, but they cannot be produced from amines bearing electrophilic substituents. Formulations in a mixture of solvents and dispersing agents are known, for example, from German Offenlegungsschrift No. 2,555,711. Formulations of this kind also cannot be produced from amines bearing electrophilic substituents because the amines are insufficiently soluble. Further formulations which are produced by mechanical comminution of diazotizable aromatic amines which can also carry electrophilic substituents, in an aqueous medium, are known from German Offenlegungsschrift No. 2,346,504 and German Auslegeschriften No. 2,249,533; 2,346,502; 2,346,612; 2,449,781; 2,449,782 and 2,449,783 which are incorporated herein by reference thereto. The liquid formulations obtained by the methods described in these patent applications published after examination, however, have bad storage stability. They tend to settle, whereby a precipitate which is very difficult to disperse, is formed, or they are thixotropic, so that they can only be made pourable by intensive mechanical treatment which makes their handling considerably more difficult. The diazonium salt solutions produced from these formulations are often turbid and also have only a limited shelf life because no suitable auxiliary products to improve these properties are available. They can therefore only be used in the modified printing and continuous dyeing processes described in the above patent applications published after examination. They are, however, not suitable for the conventional dyeing and printing processes which are still very important commercially and which are described in detail in the manual by L. Diserens, "Die neuesten Fortschritte in der Anwendung der Farbstoffe", 1st, Part, Volume 1, chapter IV, which is incorporated herein by reference thereto.

It is therefore an object of the present invention to provide highly concentrated, free-flowing dispersions of diazotizable aromatic amines bearing electrophilic substituents in aqueous media which are easy to handle, have good storage stability and have the additional advantage that they can be diazotized extremely quickly and completely. The use of such dispersions in conventional dyeing and printing processes can therefore achieve considerable technical progress.

The aqueous dispersions according to the invention contain:

(a) 30 to 60% by weight, preferably 40 to 50% by weight, of a diazotizable aromatic amine, bearing at least one electrophilic substituent, with an average particle size below 10 μm (microns), preferable below 5 μm (microns), (b) 0.1 to 5% by weight, preferably 0.1 to 1% by weight, in particular 0.1 to 0.5% by weight, of a water-soluble poly-N-vinyl lactam or a water-soluble copolymer of at least two different N-vinyl lactams or a water-soluble copolymer of at least one N-vinyl lactam with at least one other compound which can be copolymerized with the N-vinyl lactam, (c) 0.1 to 5% by weight, preferably 0.1 to 1% by weight, in particular 0.5 to 1% by weight, of an anionic dispersing agent, (d) 0 to 30% by weight, preferably 5 to 30% by weight, of at least one hydrotropic compound and-/or at least one compound which lowers the freezing point and (e) water.

Component (d) prevents the dispersions from drying out in the air or freezing at low temperatures and is therefore used to advantage. In order to prevent the formation of mould on the surface of the dispersions, one can add the fungicides which are usually employed for this purpose, such as pentachlorophenol, phosphoric acid esters or thiophosphoric acid esters.

The dispersions according to the invention are easy to prepare. The method of the invention for preparing these dispersions comprises subjecting 30 to 60% by weight, preferably 40 to 50% by weight, of component (a), based on the finished dispersion, to wet-grinding in the presence of component (b), as well as component (c) and, if desired, component (d), until the average particle size of component (a) is below 10 μm (microns), preferably below 5 μm (microns).

This method can, for example, be carried out by dissolving component (b) together with component (c) and, if desired, component (d) in water and stirring in component (a). The desired fine division (i.e. the desired particle size) is achieved subsequently by wet-grinding, for example in an agitator ball mill filled with glass beads or natural sand.

The dispersions according to the invention thus obtained remain liquid and easily pourable despite their high content of dispersed solids and despite their low content of water-soluble auxiliary products and they are stable on storage, even at extreme temperature variations, for example from −15° to +45° C. The diazotization of the dispersions according to the invention proceeds exceptionally quickly. After adding a mineral acid and an alkali metal nitrite, it is completed in a few seconds. Compared to the diazotization of conventional powder compositions, a time-saving of over 95% results.

Examples of diazotizable aromatic amines bearing electrophilic substituents which can be used in the dispersions of the invention are:
5-nitro-2-amino-1-methoxy-benzene
4-nitro-2-amino-1-methoxy-benzene
5-nitro-2-amino-1-methyl-benzene
4-nitro-2-amino-1-methyl-benzene
1-amino-2,5-dimethoxy-benzo-4-nitrile
4-benzylsufonyl-2-amino-1-methoxy-benzene
2-amino-1-methoxy-benzene-4-sulfonic acid n-butylamide 2-amino-1-methoxy-benzene-4-sulfonic acid diethylamide
2,5-diethoxy-1-amino-4-benzoylamino-benzene
4-amino-1,1'-azobenzene
3,2'-dimethyl-4-amino-1,1'-azobenzene The poly-N-vinyl-lactams which can be used in the dispersions of the invention have e.g. the formula $$\left[\begin{array}{c} R-CH \diagup (CH_2)_n \diagdown C=O \\ \diagdown N \diagup \\ \mid \\ -CH-CH_2- \end{array}\right]_x$$

wherein n is 2 or 3, R is hydrogen or lower alkyl, for example methyl or ethyl, and x is a number from 20,000 to 100,000, preferably 20,000 to 50,000. An especially well-suited poly-N-vinyl lactam is poly-1-vinyl-2-pyrrolidone.

A suitable copolymer of at least one N-vinyl lactam with at least one other compound which can be copolymerized with the N-vinyl lactam is a copolymer of 1-vinyl-2-pyrrolidone with about 20% by weight of vinyl acetate.

The anionic dispersing agents used in the dispersions of the invention can for example belong to the following classes of compounds: alkyl sulfonates, alkylaryl sulfonates, aryl sulfonates, lignin sulfonates, sulfonated phenol- or cresol-formaldehyde resins, formaldehyde-naphthalenesulfonic acid-condensation products as well as condensation products of fatty acids with aminoalkyl sulfonic acids.

Examples of hydrotropic compounds and compounds which lower the freezing point which are added to advantage, in order to prevent the dispersions according to the invention from drying out and to lower their freezing point, are ethylene glycol, propylene glycol, thiodiethylene glycol, glycerol and sorbitol.

It is unexpected and could not be forseen that the dispersions according to the invention have, despite their very low content of compounds having a dispersing action, excellent storage stability and dispersion stability. These properties are also surprising since dispersions which contain either only component (b) or only component (c) are not stable on storage and stably dispersed, but tend to thixotropy. The agglomerations formed thereby can only be comminuted again with very high expenses, if at all.

The following Examples illustrate the invention without limiting it. In the Examples, parts are parts by weight and percentages are percentages by weight.

EXAMPLE 1

5 parts of poly-1-vinyl-2-pyrrolidone (degree of polymerization about 40,000), 10 parts of the disodium salt of dinaphthylmethane-disulfonic acid and 150 parts of sorbitol are dissolved in 335 parts of water. 500 parts of 5-nitro-2-amino-1-methoxy-benzene are added to the clear solution obtained with stirring at 20° C. The viscous suspension obtained is then ground in an agitator ball mill with the aid of zirconium oxide beads (Zir-beads ® of Zircoa Refractories Company) of 2 mm diameter, until the average particle size of the amine is below 5 $\mu$m (microns). After separating off the beads, a stable, easily pourable, doughlike dispersion with an amine content of 50% is obtained.

This dispersion can be diazotized as follows: 10 parts of the dough-like dispersion, 50 parts of water and 10 parts of 35% hydrochloric acid are carefully mixed together at 15° to 20° C. 25 parts of a 10% aqueous sodium nitrite solution are then stirred in. The diazotization is already complete when all the sodium nitrite solution has been added. A stable, clear diazonium salt solution is obtained.

Compared to this, the diazotization of a conventional, commercially available powder composition of the same amine is not completed until after about 30 minutes. Since the reaction proceeds so slowly, ice must in this case be added.

If, in the above Example, the 150 parts of sorbitol are replaced by the same amount of propylene glycol or glycerol and one proceeds otherwise as before, an equally good result is obtained.

If one uses in place of 5-nitro-2-amino-1-methoxy-benzene the same amounts of 4-nitro-2-amino-1-methoxy-benzene or 3-nitro-4-amino-1-methoxy-benzene, dispersions with equally good properties are obtained.

EXAMPLE 2

5 parts of poly-1-vinyl-2-pyrrolidone, 10 parts of the disodium salt of dinaphthylmethane-disulfonic acid and 150 parts of d-sorbitol are dissolved in 425 parts of water. 10 parts of pentachlorophenol and 400 parts of 3,2'-dimethyl-4-amino-1,1'-azobenzene are added to the solution thus obtained. After homogenization, the suspension obtained is ground in an agitator ball mill which is filled with glass beads of 1 to 2 mm diameter, until the average particle size of the amine is below 5 $\mu$m (microns). After separating off the glass beads, a stable, easily pourable dispersion with an amine content of 40% is obtained.

This dispersion can be diazotized as follows: 10 parts of the dispersion, 60 parts of water of 10° to 15° C. and 1.5 parts of sodium nitrite are mixed together with stirring. Then 5 parts of 35% hydrochloric acid are added. After stirring for a short time, the diazotization is completed. A stable diazonium salt solution which does not contain any insoluble residue is obtained.

Compared to this, the diazotization of a conventional, commercially available powder composition of the same amine is not completed until after more than 30 minutes. Since the reaction proceeds so slowly, ice must in this case be added.

If, in the above Example, the 3,2'-dimethyl-4-amino-1,1'-azobenzene is replaced by the same amount of 4-amino-1,1'-azobenzene, a dispersion is obtained which is also stable on storage and has similarly good diazotizability.

What is claimed is:

1. Highly concentrated, stable, free-flowing aqueous dispersions of diazotizable aromatic amines bearing electrophilic substituents, comprising
    (a) 30 to 60% by weight of a diazotizable aromatic amine bearing electrophilic substituents and having an average particle size below 10 μm (microns),
    (b) 0.1 to 5% by weight of a water-soluble poly-N-vinyl lactam or a water-soluble copolymer of at least two different N-vinyl lactams or a water-soluble copolymer of at least one N-vinyl lactam with at least one other compound which can be copolymerized with the N-vinyl-lactam,
    (c) 0.1 to 5% by weight of an anionic dispersing agent,
    (d) 0 to 30% by weight of at least one hydrotropic compound and/or at least one compound which lowers the freezing point and
    (e) water.

2. The dispersions according to claim 1 containing 0.1 to 1% by weight of component (b) and 0.1 to 1% by weight of component (c).

3. The dispersions according to claim 1 or 2, wherein the diazotizable aromatic amine is substituted by at least one nitro, cyano, alkylsulfonyl, aralkylsulfonyl, arylsulfonyl and/or sulfonamide group and can also be substitued by at most two nucleophilic substituents.

4. The dispersions according to claim 1 or 2, wherein the diazotizable aromatic amine is a 4-amino-1,1'-azobenzene which can be substituted by at most two low molecular weight alkyl groups.

5. The dispersions according to claim 1, wherein the diazotizable aromatic amine has an average particle size below 5 μm (microns).

6. The dispersions according to claim 1, wherein component (b) is poly-1-vinyl-2-pyrrolidone.

7. The dispersions according to claim 1, wherein component (c) is the disodium salt of dinaphthylmethane-disulfonic acid.

8. The dispersions according to claim 1, wherein component (d) is at least one glycol.

9. A method of preparing the dispersions according to claim 1, which comprises subjecting 30 to 60% by weight of component (a), based on the finished dispersion, to wet-grinding in the presence of component (b) as well as component (c) and, if desired, component (d), until the average particle size of component (a) is below 10 μm (microns).

10. The method according to claim 9, characterized in that the wet-grinding is continued until the average particle size of component (a) is below 5 μm (microns).

11. The use of the dispersions according to claim 1 for the preparation of azopigments in substance or of azodyestuffs on textile substrates, characterized in that the dispersion is diazotized in a way known per se and the diazonium salt solution thus obtained is coupled in a way known per se with a coupling component.

12. Azopigments, prepared according to the method of claim 11.

13. Dyed or printed textiles, obtained according to the method of claim 11.

* * * * *